$$d_m/D_p = \frac{1}{2N}\left(\frac{1-V_p}{V_p}\right)$$

FIG. 2

INVENTORS.
PETER SCHWARZKOPF
DALTON A. PEARSON
BY Thomas Scott Macdonald
ATTORNEY

United States Patent Office 3,362,818
Patented Jan. 9, 1968

3,362,818
FABRICATION OF POLY POROSITY
MICROSTRUCTURES
Peter Schwarzkopf, Van Nuys, and Dalton A. Pearson, Canoga Park, Calif., assignors to North American Rockwell Corporation, a corporation of Delaware
Filed Jan. 5, 1967, Ser. No. 607,525
3 Claims. (Cl. 75—201)

ABSTRACT OF THE DISCLOSURE

A method for forming porous structures utilizing new techniques in powder metallurgy, and a formula for the precise calculation of porosity in a formed structure. The method involved the utilization of a primary pore forming material to form induced porosity in the structure, together with, when desired, a secondary pore forming material utilized to form interstitial pores in the walls of the porous matrix.

---

Prior to the herein invention, there have been known methods for forming porous bodies using powder metallurgy techniques. Typical of such prior work is U.S. Patent No. 2,672,415, dated Mar. 16, 1954, wherein there is disclosed a method of forming porous silver bodies. As is disclosed therein, silver powder is mixed with a sublimable pore forming material such as ammonium acid carbonate. The mixture is pressed, heated to a temperature to volatize and remove the ammonium acid carbonate, and then sintered. The resultant product consists of porous particles of silver permanently joined into a coherent mass with irregular interstices between the porous particles. As indicated in the patent and as now common in the art, porosity was controlled solely by the amount of pore forming material added. Little attention was paid to the particle size of the matrix material, which is silver in the case of the patent; or the particle size of the pore forming material. No effort was made to control the size, shape and distribution of the pores for optimization of porous properties. Additionally, in the prior art and exemplified in the patent, no attempt was made to use more than one pore forming material at a time to alter porosity distribution or contact area. Further, there was no appreciation of the utilization of a pore forming material to control permeability. As indicated in the patent, porosities not generally exceeding approximately 85 percent could be achieved.

Porous metal structures find use as filters, electrodes and ionizers. Further uses include self-cooled bodies wherein a second phase is disposed in the pores previously formed.

The herein invention sets forth for the first time in the art a means of forming porous bodies utilizing the relative sizes of the matrix material and pore forming material so as to control the pore size distribution and shape of the pores for optimization of the properties. The total porosity in the herein method can exceed 95 percent. Further, two or more size ranges of induced porosity may be retained in porous bodies formed in accord with this invention.

Porosity in powder metallurgical products can be described as a result of either interstitial or induced pores. Interstitial pores are the voids formed between neighboring particles in a more or less closely packed aggregate. In contrast induced pores are created by the orderly bridging of particles caused by the addition of a powdered pore former. The void volume is subsequently produced by removal of the pore former by solution, evaporation or decomposition. In the case of composites, the pore former can be allowed to remain as one component of the final product. Control of the properties of any interstitial pore structure resides primarily in the size, shape and size distribution of the metal powders. Unconsolidated poured aggregates, as spheres, are regular equiaxed particles distributed in irregular pore networks and contain 30 to 50 percent porosity. The size and shape of pores are a direct function of powder size and shape. Conversely, induced pore networks are usually the image of the size and shape of the added pore former. This particularly is true as the size and volume of the pore former particles increases in relation to the metal powder. Induced pore diameters may be orders of magnitude larger than the metal particle diameter and porosities in excess of 90 percent are possible in accord with this invention. Part of this porosity consists of finer interstitial voids in induced pore walls which contribute to the overall inner connection and permeability of the structure. In other words, as can be seen, the characteristics of interstitial porosity depend closely upon the shape, size and distribution of the powder particles, with each pore being surrounded by from four to six particles in a closely packed array. Conversely, the size and shape of pores produced by packing defects may have little relation to the size and shape of the powder particles since a pore formed by a gross defect as a bridge may be surrounded by several hundred particles.

This invention concerns a process for the precise microstructural control of the porous properties of bodies produced by powder metallurgy. These bodies contain both the interstitial void volume formed between neighboring close packed particles and the pores induced by pore former powder particles. In this invention, any powder susceptible to powder metallurgy techniques can be used to form the structures of the invention. Such matrix powders, thus, could be ceramics, cermets, metals, alloys and even polymers such as polyphenylene powder. Of course, the pore formers must be selected so as to leave a melting point below that of the given matrix powder. Reference is now made to the drawings wherein:

FIG. 2 is a photomicrograph of a porous structure of this invention.

The prior art methods of forming porous bodies were limited in the total range of porosity and permeability since the predominant porosity was interstitial. This is true even in the aforementioned Patent 2,672,145 where it can be seen that large voids existed between the agglomerate particles of silver. The particular advancement of the herein invention relates to the development and control of systematic packing faults in a consolidated powder mass, to add a unique and valuable dimension to porous microstructures. The induced porosity as opposed to interstitial forms, together with interstitial voids, forms a polyporosity structure.

It has been found that the requirement for structural integrity of porous structures particularly of materials containing an excess of 50 percent by volume pores is connectivity of the pore wall network. In addition, for the fabrication of composites containing the phase which is removed in service, connectivity of the matrix must be guaranteed to prevent disintegration of the second-phase-depleted zone. To provide the guide for the formation of the structures of this invention, so as to properly choose the sizes and volume fractions of the matrix pore former powder particles, the following approximate geometric relation was derived:

$$\frac{1}{2}\left(\frac{1-V_p}{V_p}\right)\left(\frac{1}{1-P_m}\right)=N\left(\frac{d_m}{D_p}\right)$$

where $V_p$ = volume fraction (induced) pore former
$P_m$ = cell wall (interstitial) porosity
$N$ = cell wall thickness in matrix particle diameters
$d_m$ = matrix particle diameter
$D_p$ = primary pore former diameter Thus, volume fractions and powder particle diameters are chosen so that $$N \geq 1$$

Figure 3:
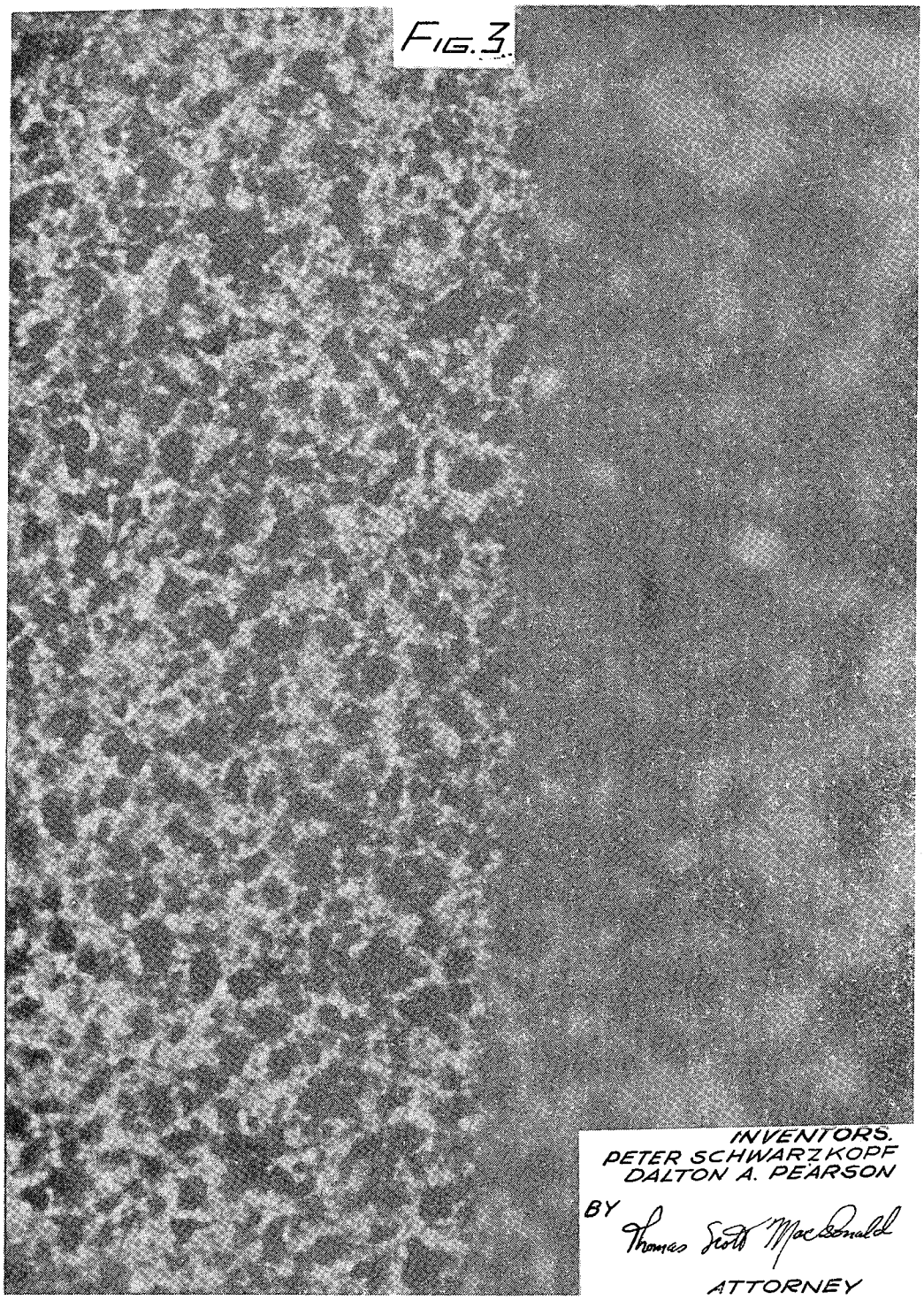
FIG. 3 is another photomicrograph of a porous structure of this invention.

It can be seen from the above formula that when $N=1$, a structure can be formed wherein the matrix pore wall thickness is comprised potentially of only one particle of the matrix powder. Such a body is seen in FIG. 2 wherein the white particles are single particles of nickel powder at 750× magnification. The dark area surrounding the white particles comprises the porous network. The structure shown has a total porosity of about 95 percent. FIG. 3 discloses a molybdenum porous body made according to the invention at 11× magnification having a total porosity of about 56 percent.

The invention is found to have outstanding results when two types of pore formers are utilized. The two types can be referred to as hard and soft pore formers. The hard pore former creates the larger induced pores in the structure. Without the addition of a second soft pore former, the interstitial porosity of the pore wall is formed essentially as a result of powder consolidation and would be similar to a structure without induced pores. The second soft pore former upon compaction of the powder mass increases pore wall porosity which improves the inner connectivity of the larger induced pore volume. The net effect is to increase the permeability and connectivity of the pore network to an induced pore network in the pore walls. This is accomplished, as indicated, during compaction and can be thought of as the extrusion of the softer pore former into the powder of the matrix. For example, the hard pore former could be urea and the soft pore material could be camphor. Thus, a mixture of metal particles with the two pore formers upon compaction would form large pores about the urea while the soft champhor would extrude between the particles of metal surrounding the urea pore former. In the foregoing formula, $P_m$ represents the volume percent of this soft pore former. By this means, in using the foregoing formula, one can control both the induced porosity and the interstitial porosity in the walls surrounding the large pores.

Figures 1, 4:
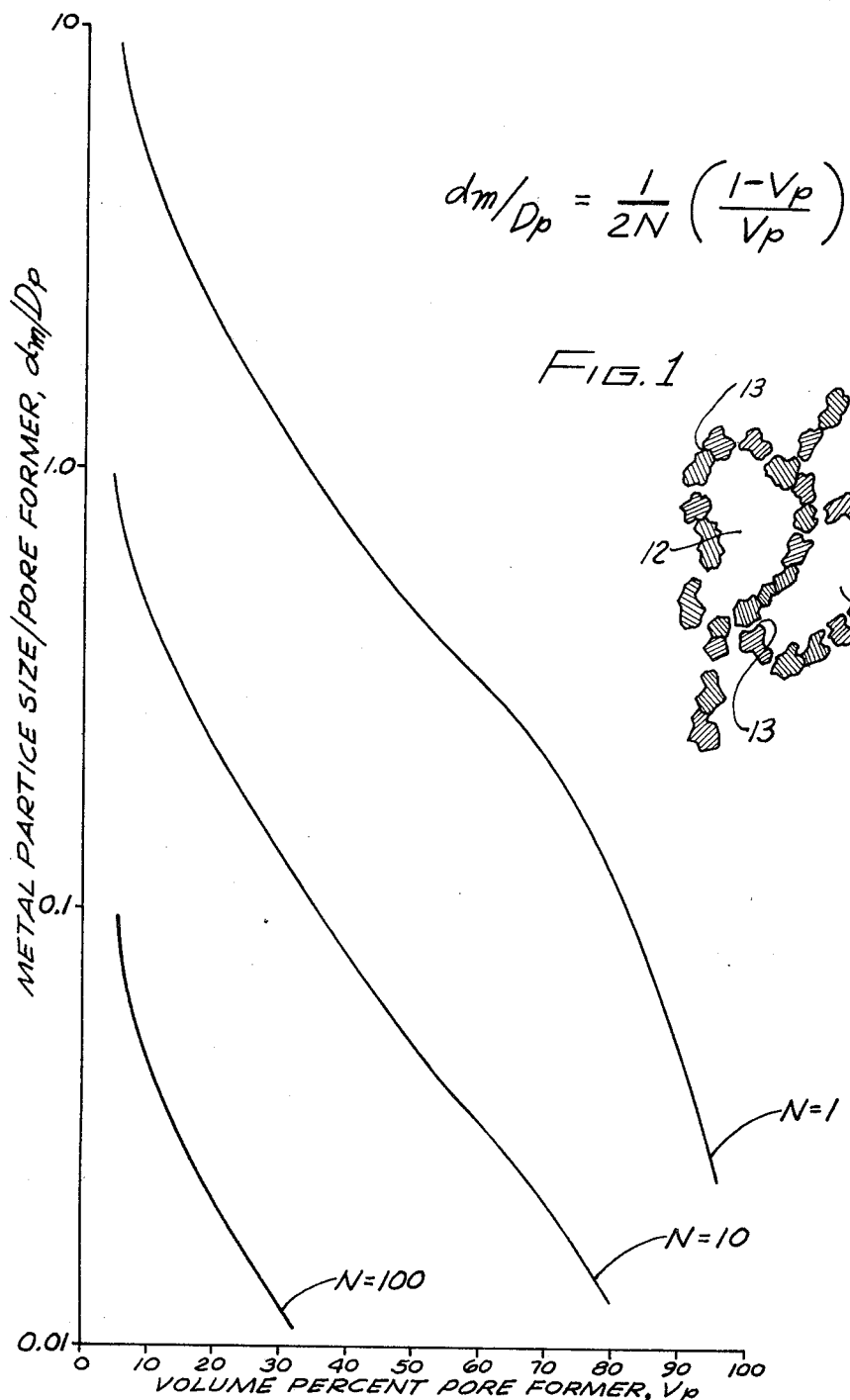
FIG. 1 is a pictorial representation of a porous microstructure of the invention.
FIG. 4 is a graph showing relationship of various parameters used to form the bodies of this invention.

Attention is directed to FIG. 1 wherein the particles of metal matrix 11 surround the induced pores 12. Between adjacent particles 11 are formed the small interstitial pores 13 which serves to connect the larger induced pores throughout the matrix. Since this is only a two-dimensional representation, not all of the interstitial pores will be seen.

Alternative to a soft pore material such as camphor, the material used to form the interstitial porosity can be of a much finer divided powder than the hard pore former which creates the large induced pores. The very fine powder would be mixed or extrudable between the matrix forming powder in the same sense that the camphor is.

It should be pointed out and it should be obvious that the use of the formula is an approximation of a desired end product. Irregularity as to the size of particles and the effect of the compaction of the mass serves to prevent achieving the exact desired end result as indicated by the formula. However, by utilizing the formula, one will approximate the porosity desired throughout the whole structure though at a given cross section one might not achieve exactly what the formula would indicate.

Thus, in the foregoing formula $V_p$ would relate to the pore former volume fraction of the hard primary pore former while $P_m$ relates to the cell wall porosity formed by the soft secondary pore former. Thus, for example, if a structure is made utilizing 25 volume percent of a primary hard pore former and 15 percent of a soft secondary pore former, the formula would be reduced to $$\frac{1}{2}\left(\frac{1-.25}{.25}\right)\left(\frac{1}{1-.15}\right)=N\left(\frac{d_m}{D_p}\right)$$

It can be seen that there are innumerable variables that one can choose to tailor-make the pore structure. If one were to want a high strength structure porous material, N would have to be increased. In other words, the thickness of the walls comprising the pore structure would have to comprise more individual particles than would otherwise be necessitated. If the wall particle diameter and primary pore former diameters are fixed, then N can be varied by, for example, increasing the volume of the secondary pore former while maintaining the volume fraction of primary pore former. A graph similar to the one shown in FIG. 4 can be prepared so that for a chosen value of any of the parameters one can select the remaining one needed to obtain the desired porous structure.

The basic process of this invention is utilized to additionally manufacture graded porous structures by combining in a sequential fashion individual elements of homogeneous microstructures. Thus, any complex structure may be constructed in a building block fashion by sequential compaction of individual volumes of a specific powder composition. This is achieved by isostatic compaction often using shaped rigid mandrels and flexible outer molds. Powders of appropriate composition are separately pressed to develop required interstitial and induced pore microstructures. Thus, a first layer formed about a mandrel could have an entirely different composition and porosity from the next successive layer formed thereabout.

In many instances, the porous structure formed serves as a storage means for a second material. After isostatic compaction the structure is then sintered whereby the pore forming material is sublimed, dissolved, etc., leaving the porous structure. Often a second phase is introduced into a completed fully sintered matrix and in this way the properties of the matrix, such as permeability, pore size porosity and degree of interparticle bonding, can be predetermined and not altered. Examples of such materials include metals such as Zn, Sn, Cu, Ag, Pb and alloys thereof. Introduction of the second phase into a porous matrix can be accomplished in several ways. Through infiltration the finished matrix is brought into contact with a molten second phase under vacuum or protective atmosphere. If the molten material wets the matrix, it will be drawn into the pores by the action of capillary forces. If capillary forces are insufficient to fill the void volume completely, variations of the infiltration method can be used. For example, addition of detergents to the unconsolidated powder, to the finished matrix or to the coolant can be used to promote wetting of the matrix. In larger sizes the use of pressure or vacuum pressure impregnation cycles, complete immersion of the matrix, degassing additions to the second phase, or directional infiltration and solidification might be necessary.

Thus, as previously indicated, the herein invention is applicable to any powdered material susceptible to isostatic compaction by conventional powder metallurgical techniques. Included are metal powders, ceramic powders, polymers and the like. Non-limiting examples of various metal matrices include nickel, tungsten, molybdenum and other refractory metals, and their alloys and the like. The range of size of the powders utilized to form the matrix material would typically range from 0.1 to 100 microns. The hard pore formers referred to used to form the relatively large pores in the structure include materials such as ammonium carbonate, ammonium bicarbonate and urea. These hard pore formers range in size from 1 to 1000 microns. The soft pore forming material would include, for example, materials such as camphor and stearic acid. Solution of the secondary pore former in volatile organic solvents such as ether or acetone, though not necessary, may assist uniform distribution throughout the powder mass. Soft pore formers may be ground and screened after freezing in liquid nitrogen or Dry Ice/acetone.

In addition to these non-powdered forms of soft pore formers, very fine powders of material such as the above hard pore former can be used to form a bimodal size distribution, with the finer size serving as the interstitial pore former. The fine powder pore formers would range in size from .01 to 10 microns. The mixed powders used to form the porous structure are generally placed in a pliable mold of a material such as polyvinyl chloride and then isostatically pressed in the technique conventional in the powder metallurgical art. The compacted mass is then raised to the sintering temperature of the powder forming the matrix so as to achieve the sintering. During this process, the hard and soft pore forming material is generally driven off or sublimed leaving both the large pores and the interstitial pores in the structure.

Pressing pressures to compact the powders depend upon the desired compaction and the type of material utilized. A wide range of such pressures are feasible, ranging from 500 to 75,000 p.s.i. When multi-layered structures are formed, the initial layer is usually not compacted at too high pressures and with each successive layer being pressed at successively higher pressures. This is done in order to achieve good interlayer bonding. Since a hard compacted layer does not present a surface as easily susceptible to bonding with the successive layer, it is preferred to successively increase these pressures. In a three-layered structure, for example, pressures could range from 2000 p.s.i. for the first layer formed, 15,000 p.s.i. for the second layer and 40,000 p.s.i. for the third layer.

To this point, the invention has been discussed with relation to utilizing pore formers that are removed from the structure during the sintering operation. As indicated, often the sintered porous structure formed is later impregnated with a coolant or other type of material, which is the working material. It is possible in this invention to fabricate self-cooled composites by coprocessing the matrix with coolant powders, if the components are mutually compatible during consolidation sintering. The composite microstructures produced by the coprocessing technique can be considered analogous to induced pore structures in which the pore former is not removed from the matrix. Similar considerations exist for particle size distribution of matrix and pore former powders as in induced structures to insure inner connection of matrix in coolant phases. For example, inner connection may be more readily achieved if the particle size of the pore former powder is made larger relative to the matrix particle size as the volume fraction of pore former is increased in the composite. Examples of pore formers which are not removed during the sintering of the matrix material include refractory oxides ($Al_2O_3$, $ZrO_2$, $HfO_2$, $ThO_2$) solid lubricants ($MoS_2$, $WS_2$).

Both the hard and soft pore forming materials referred to above by way of specific example are materials that are readily sublimable upon heating without destroying the matrix material. Additionally, it is important that the materials upon vaporizing do not leave a residue in the matrix. Thus, any suitable material that meets this criteria can be utilized as the pore formers where it is desired to remove the material from the matrix. A further obvious point in choosing a suitable pore former is the fact that the material will not react with the matrix chosen. Thus, within the set bounds, a wide variety of matrices and pore formers can be successfully utilized in accord with this invention. Further, as previously discussed, one can form porous matrices wherein the matrix is filled with a material that would be subsequently removed only at extremely high temperatures, for example, a nickel matrix having aluminum fluoride therein as the pore former. The aluminum fluoride is not sublimable in the sintering of the nickel matrix material. Thus, it remains in the system at the completion of sintering. The net effect is a porous nickel matrix infiltrated or having the pores occupied by aluminum fluoride. Subsequently, when the material is subjected to extremely high temperatures, the aluminum fluoride is sublimed serving to cool the nickel matrix. The concepts of the herein invention are thus utilized to formulate a particular structure wherein the pore forming material is subsequently useful and not removed from the structure during sintering. In view of this, virtually any compatible material to a chosen matrix can be used as a pore former regardless of whether or not it is sublimable prior to sintering.

The herein invention is not limited to utilizing a single size of either hard or soft pore former in forming the structures. Often, in order to achieve high density packing of pore formers, bi- and tri-modal blends, for example, of these pore formers would be utilized. The effect of the varying sizes of the pore former according to varied volume percents of each size can be determined by individually calculating the effect of the size and percent thereof utilizing the formula of this invention.

As will be shown in the following examples, the utilization of the formula of the herein invention enables one to selectively develop and tailor-make a porous structure. One can control the induced porosity by the utilization of a primary hard pore former. One can additionally control the thickness of the pore walls as indicated by the number of metal particle diameters of the matrix material. When adding the secondary soft pore former, one can also control the interstitial porosity. It is apparent that in high structural strength materials, the pore wall thickness will be greater than in those materials that will not bear load. It is believed that the invention will be further understood from the following detailed examples:

*Example 1*

A porous molybdenum structure was made. The molybdenum metal powder used was six microns. Urea was selected as the pore former and was mixed with the metal in a ratio of 75 percent urea and 25 percent of the molybdenum powder. The pore former had a size of 300 microns. After mixing the powders, the mixture was put into a cylindrically shaped polyvinyl chloride mold. The mold was then put into an isostatic press and was subjected to a pressure of 10,000 p.s.i. After removal from the press, the sample was then sintered at 2530° F. for 1 hour. The resultant specimen had a diameter of .61" and was .13" thick. Using the foregoing known factors in the equation, one will have the resultant figures $$\frac{6}{300} \times N = \frac{1}{2}\left(\frac{1-.75}{.75}\right)\left(\frac{1}{1-0}\right)$$

solving the equation for N, the pore wall thickness equals 8. In other words, in the above sample, the wall surrounding an individual induced pore was 8 molybdenum particles thick or, stated another way, generally the walls throughout the porous material comprised a thickness of 8 molybdenum particles. The resultant sintered molybdenum specimen was infiltrated with molybdenum di-sulphide, $MoS_2$, by extruding the molybdenum di-sulphide at 15,000 p.s.i. through the sample. It was found that there was 21 percent residual voids after the molybdenum di-sulphide impregnation. This was determined by utilizing the difference between the total porosity and molybdenum di-sulphide volume percent and indicates the greater interconnection of the material pore volume.

Example 2

The procedure of Example 1 was repeated utilizing the same amounts of materials except that the 75 volume percent of pore former was now distributed as 32 volume percent urea and 43 volume percent of a secondary soft pore former which was camphor. Utilizing the formula of this invention, it is calculated that the pore wall thickness comprises 93 metal diameters. At this point the compacting pressure was increased to 15,000 p.s.i. with the resultant specimen having dimensions of .59″ diameter and a thickness of .18″. The molybdenum di-sulphide was again impregnated into the resultant structure utilizing a pressure of 10,000 p.s.i. There was a 22 weight percent increase in the molybdenum di-sulphide content in this pore structure over that of the previous one indicating a greater increase in interconnected porosity because of the extrusion of the soft pore former through the metal powder walls, and its subsequent formation of pores in that area.

Example 3

A pore structure of tungsten was made utilizing a powder size of 8 microns. 35 volume percent of urea was utilized as a pore former. The urea had a particle size of 60 microns. As in the previous examples, the mixed powder material was placed in a polyvinyl mold which was subjected to an isostatic pressure of 20,000 p.s.i. The resultant sample had a diameter of 1.12″ and was .286″ thick. Utilizing the formula of this invention, it could be determined that the pore wall thickness was 7 metal diameters. The permeability of this structure was $5.1 \times 10^{-10}$ cm.$^2$. This was determined from the pressure drop for different nitrogen flow rates through the specimen and calculated from the Duwez and Martem equation for Darcy's law.

Example 4

The same procedure as in Example 3 was repeated utilizing the same size primary pore former which was urea and the same size tungsten metal powder. However, the 35 volume percent of pore former now comprises 28 volume percent urea and 7 percent of a secondary pore former which was camphor. The wall thickness increases to 10 metal diameters. The resultant specimen formed at 20,000 p.s.i. was 1.08″ in diameter and .32″ thick. The permeability increased due to the presence of the secondary pore former to $14 \times 10^{-10}$ cm.$^2$, an increase of 180 percent.

Example 5

A structure of porous polyphenylene was made by pressing a mixture of 33 volume percent polyphenylene with 67 volume percent urea of −200 mesh size. The pressing was isostatic at 15,000 p.s.i. The resultant sample had a one-half inch diameter and was .64″ long. The pressed product was then sintered in argon at 1830° F. for one hour. The theoretical density of a product having the dimensions of a non-porous polyphenylene product would be 1.3 g./cc., while the actual density of the item tested was 0.5 g./cc. Thus, the porosity was determined to be 62 percent by calculation.

Example 6

A multi-layered structure in a configuration of a nozzle for utilization with rocket motors was formed. A stainless steel mandrel having the desired configuration of a nozzle was utilized and placed in a polyvinyl chloride bag. A first layer formed was comprised of the following composition of 1.5 weight percent stearic acid and the remainder being tungsten. The tungsten was composed of a mixture of 30 weight percent >200 mesh spherical powder and 70 weight percent (G) powder, which is powder of a size noted as 6.8 Fisher sub-sieve. This first layer was isostatically pressed at 40,000 p.s.i. and had a thickness of ¼″. After pressing, the mandrel with the layer of material was removed and machined to ⅛″ thickness. A second layer comprised of 1 percent stearic acid with the remainder being −325 mesh spherical tungsten was pressed at 50,000 p.s.i. and was ⅛″ thick. The third layer was comprised of a composition of 30 weight percent ammonium carbonate and 70 weight percent (G) tungsten. This layer which would have an ultimate porosity of 80 percent was ⅝″ thick. The fourth layer had the composition identical to the first layer and was pressed at 10,000 p.s.i. and was originally ¼″ thick and was machined to ⅛″. It is noted that the fourth layer was pressed at quite low pressure. This was due to the fact that the third layer was so extremely porous and it was not desired to affect this porosity by exerting extreme pressure from the fourth layer. The final product was pre-sintered at 2200° F. for two hours in a hydrogen atmosphere to reduce the possibility of tungsten oxide forming. The material was next pre-sintered at 3000° F. for two hours in a vacuum. It was finally sintered at 4000° F. for four hours. The resultant porous structure was then infiltrated with zinc at 1200° F. for one hour in a hydrogen atmosphere.

Although the invention has been described and illustrated in detail, it is to be clearly understood that the same is by way of illustration and example only and is not to be taken by way of limitation, the spirit and scope of this invention being limited only by the terms of the appended claims.

We claim:
1. The method of forming porous bodies having controlled induced pores, controlled wall thickness of the matrix material of at least one particle thickness surrounding the induced pores and controlled interstitial porosity in the walls surrounding the induced pores comprising:
   mixing a matrix forming powder with a hard non-extrudable primary pore former powder, said primary pore former being present in an amount to form the desired induced porosity,
   adding to the mixture a secondary pore former selected from the class consisting of soft extrudable material and finely divided powder susceptible to pressure extrusion between the matrix forming powder in an amount according to the desired interstitial porosity,
   compacting said mixture,
   and sintering said compacted mass.
2. The method of claim 1 wherein said primary and secondary pore formers leave no residues in said matrix and further comprising:
   removing said pore formers from said compacted mass prior to completion of the sintering.
3. The method of claim 1 wherein said secondary interstitial pore former is sublimable leaving no residue in said matrix.

References Cited

FOREIGN PATENTS 580,414 9/1946 Great Britain.
616,839 1/1949 Great Britain.

L. DEWAYNE RUTLEDGE, *Primary Examiner.*

A. J. STEINER, *Assistant Examiner.*